(12) United States Patent
Hasegawa et al.

(10) Patent No.: US 10,713,215 B2
(45) Date of Patent: Jul. 14, 2020

(54) ALLOCATING NON-CONFLICTING INODE NUMBERS

(71) Applicant: International Business Machines Corporation, Armonk, NY (US)

(72) Inventors: Tohru Hasegawa, Tokyo (JP); Sosuke Matsui, Tokyo (JP); Izuru Narita, Kamakura (JP)

(73) Assignee: International Business Machines Corporation, Armonk, NY (US)

( * ) Notice: Subject to any disclaimer, the term of this patent is extended or adjusted under 35 U.S.C. 154(b) by 802 days.

(21) Appl. No.: 14/940,544

(22) Filed: Nov. 13, 2015

(65) Prior Publication Data
US 2017/0139932 A1    May 18, 2017

(51) Int. Cl.
*G06F 16/178*    (2019.01)
*G06F 16/11*    (2019.01)

(52) U.S. Cl.
CPC .......... *G06F 16/122* (2019.01); *G06F 16/178* (2019.01)

(58) Field of Classification Search
CPC ............................................... G06F 17/30082
USPC ...................................................... 707/626
See application file for complete search history.

(56) References Cited

U.S. PATENT DOCUMENTS

| | | | |
|---|---|---|---|
| 5,513,314 A | 4/1996 | Kandasamy | |
| 7,783,611 B1 | 8/2010 | Hamilton | |
| 8,200,638 B1 | 6/2012 | Zheng et al. | |
| 8,396,832 B2 | 3/2013 | Adkins et al. | |
| 8,650,158 B2 | 2/2014 | Adkins et al. | |
| 8,977,598 B2 | 3/2015 | Montulli | |
| 9,002,911 B2 | 4/2015 | Anderson | |
| 9,411,526 B1 * | 8/2016 | Broido | G06F 3/067 |
| 9,594,763 B2 | 3/2017 | Lord | |
| 9,965,361 B2 | 5/2018 | Iwasaki | |
| 2003/0191745 A1 | 10/2003 | Jiang | |
| 2005/0234867 A1 | 10/2005 | Shinkai | |
| 2007/0055702 A1 | 3/2007 | Fridella | |

(Continued)

FOREIGN PATENT DOCUMENTS

WO    2013171805 A1    11/2013

OTHER PUBLICATIONS

Disclosed Anonymously, "Segmented Filesystem Design for Superior Scalability and Performance", IP.com No. 000234120, Jan. 13, 2014, 9 pages.

(Continued)

*Primary Examiner* — Alford W Kindred
*Assistant Examiner* — Allen S Lin
(74) *Attorney, Agent, or Firm* — Rakesh Roy

(57) ABSTRACT

A method for allocating non-conflicting inode numbers between files generated at a first location and files generated at another location is provided. The method includes providing an inode number allocation rule table indicating availability for assignment a plurality of inode number allocation rules associated with the first location and the another location, generating a fileset at the first location by assigning an available inode number allocation rule to the fileset, registering, in the inode number allocation rule table, information associated with the fileset, and generating a file at the first location by determining the fileset within which to generate the file; and allocating an inode number for the file based on the available inode number allocation rule assigned to the fileset.

20 Claims, 9 Drawing Sheets

(56) References Cited

U.S. PATENT DOCUMENTS

| | | |
|---|---|---|
| 2007/0156791 A1* | 7/2007 | Everhart ............. G06F 11/2094 |
| 2008/0189342 A1 | 8/2008 | Bhattacharya |
| 2010/0057755 A1 | 3/2010 | Schneider |
| 2010/0250508 A1* | 9/2010 | Erofeev ................ G06F 3/0604 |
| | | 707/704 |
| 2011/0016085 A1 | 1/2011 | Kuo et al. |
| 2011/0282917 A1 | 11/2011 | Desai |
| 2012/0030265 A1* | 2/2012 | Anderson ......... G06F 17/30091 |
| | | 707/830 |
| 2012/0066182 A1 | 3/2012 | Chang |
| 2013/0138615 A1 | 5/2013 | Gupta |
| 2013/0218934 A1* | 8/2013 | Lin ....................... G06F 16/182 |
| | | 707/828 |
| 2013/0268493 A1 | 10/2013 | Berman et al. |
| 2013/0275653 A1 | 10/2013 | Ranade |
| 2014/0081979 A1 | 3/2014 | Pn |
| 2016/0259801 A1 | 9/2016 | Lee |
| 2016/0292047 A1* | 10/2016 | Bender ............. G06F 17/30221 |
| 2018/0225181 A1 | 8/2018 | Iwasaki |

OTHER PUBLICATIONS

Linux Defenders, "Reliable, Scalable, and High-Performance Distributed Storage: Distributed Metadata Management", IP.com No. 000234959, Feb. 19, 2014, 10 pages.
Mell et al., "The NIST Definition of Cloud Computing", National Institute of Standards and Technology, Special Publication 800-145, Sep. 2011, pp. 1-7.
http://gmailblog.blogspot.jp/2011/02/gmail-back-soon-for-everyone. html, "Gmail Back Soon for Everyone", dated Mar. 2, 2011, 1 page.

* cited by examiner

ALLOCATING NON-CONFLICTING INODE NUMBERS

BACKGROUND

The present invention generally relates to generating metadata, and more particularly to allocating non-conflicting inode numbers between files generated at a first location and files generated at another location.

In a hierarchical data storage system, data backup may include pre-migration of data to a backup medium (e.g., continuous copying of data from a disk to a tape). Metadata associated with the data may also be copied and used for restoration of the backed up data. Metadata may include information about a data file or directory, such as time and date of creation, creator/owner, file size, file tree information, etc. Certain metadata (e.g., owner of the file (UID), file size, etc.) for a file may be stored in a structure called an inode. Each inode may be assigned an ID called an inode number. Typically, each inode number is unique to the file system or partition containing the inode. The contents of the data file or directory associated with the inode may be stored elsewhere on a disk. In the case of data files physically stored on a backup tape, a table (e.g., a file-tape mapping table) may include inode numbers and the locations on the backup tape for the data files corresponding to the inode numbers. A directory entry may list inode numbers and corresponding filenames.

In one example of file restoration, backup tapes containing backed up data may be brought to a secondary site for restoration. In another example of file restoration, metadata associated with the backed up data (e.g., file tree information) may initially be written from a backup tape to a disk at the secondary site and, subsequently, backed up data (e.g., files) may be written from the tape to the disk when the backed up data is accessed/requested. In such examples, the inodes for the backed up data may be restored first and then the associated data may be written from the backup tapes (or other media) when needed.

In one example, a file system associated with a first location (e.g., a primary site) may assign inode numbers independently from a second file system associated with a second location (e.g., a disaster recovery site). A first file generated at the first location may be assigned an inode number that conflicts with the inode number assigned to a second file at the second location. Restoration of the inode associated with the first file may not occur at the second location because the inode number for the first file has already been allocated at the second location.

SUMMARY

According to one embodiment, a method for allocating non-conflicting inode numbers between files generated at a first location and files generated at another location is provided. The method may include providing an inode number allocation rule table including a plurality of inode number allocation rules associated with the first location and the another location, and indicating availability of the plurality of inode number allocation rules for assignment, generating a fileset at the first location by assigning an available inode number allocation rule to the fileset, registering, in the inode number allocation rule table, information associated with the fileset, and generating a file at the first location by determining the fileset within which to generate the file, and allocating an inode number for the file based on the available inode number allocation rule assigned to the fileset. The information associated with the fileset may include at least one of a fileset ID, a mount point, and an identification for the first location.

According to another embodiment, a computer program product for allocating non-conflicting inode numbers between files generated at a first location and files generated at another location is provided. The computer program product may include at least one computer readable non-transitory storage medium having computer readable program instructions for execution by a processor. The computer readable program instructions may include instructions for providing an inode number allocation rule table including a plurality of inode number allocation rules associated with the first location and the another location, and indicating availability of the plurality of inode number allocation rules for assignment, generating a fileset at the first location by assigning an available inode number allocation rule to the fileset, registering, in the inode number allocation rule table, information associated with the fileset, and generating a file at the first location by determining the fileset within which to generate the file, and allocating an inode number for the file based on the available inode number allocation rule assigned to the fileset.

According to another embodiment, a computer system for allocating non-conflicting inode numbers between files generated at a first location and files generated at another location is provided. The system may include at least one processing unit, at least one computer readable memory, at least one computer readable tangible, non-transitory storage medium, and program instructions stored on the at least one computer readable tangible, non-transitory storage medium for execution by the at least one processing unit via the at least one computer readable memory. The program instructions may include instructions for providing an inode number allocation rule table including a plurality of inode number allocation rules associated with the first location and the another location, and indicating availability of the plurality of inode number allocation rules for assignment, generating a fileset at the first location by assigning an available inode number allocation rule to the fileset, registering, in the inode number allocation rule table, information associated with the fileset, and generating a file at the first location by determining the fileset within which to generate the file, and allocating an inode number for the file based on the available inode number allocation rule assigned to the fileset.

BRIEF DESCRIPTION OF THE SEVERAL VIEWS OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Various embodiments of the present invention will now be discussed with reference to FIGS. 1-9, like numerals being used for like and corresponding parts of the various drawings.

According to one embodiment, provided is a method for allocating non-conflicting inode numbers between files generated at a first location and files generated at another location by providing a table for inode number allocation rules assigned (or available for assignment) to filesets generated (or to be generated) at two or more locations (e.g., separate data storage sites, separate file systems, etc.). Each inode number allocation rule may determine a unique range of inode numbers that may not overlap (or conflict) with inode numbers generated from other inode number allocation rules. The inode number allocation rule table may limit assignment of one fileset per inode number allocation rule, which may prevent multiple filesets from being associated with the same inode number allocation rule and may prevent multiple files from having the same inode number. Thus, inode number conflict may be avoided during metadata restoration of files from a first location at another location (e.g., a secondary site or location). After an inode (associated with a first file) is restored (e.g., during metadata restoration), the directory entry associated with the first file may be restored.

The methods, computer program products, and systems disclosed herein may avoid inode number conflict during metadata restoration at a restoration location by separating ranges of inode numbers (e.g., determined by separate inode number allocation rules) between files stored (e.g., generated, restored, etc.) at the restoration location and files generated elsewhere.

Figure 1:
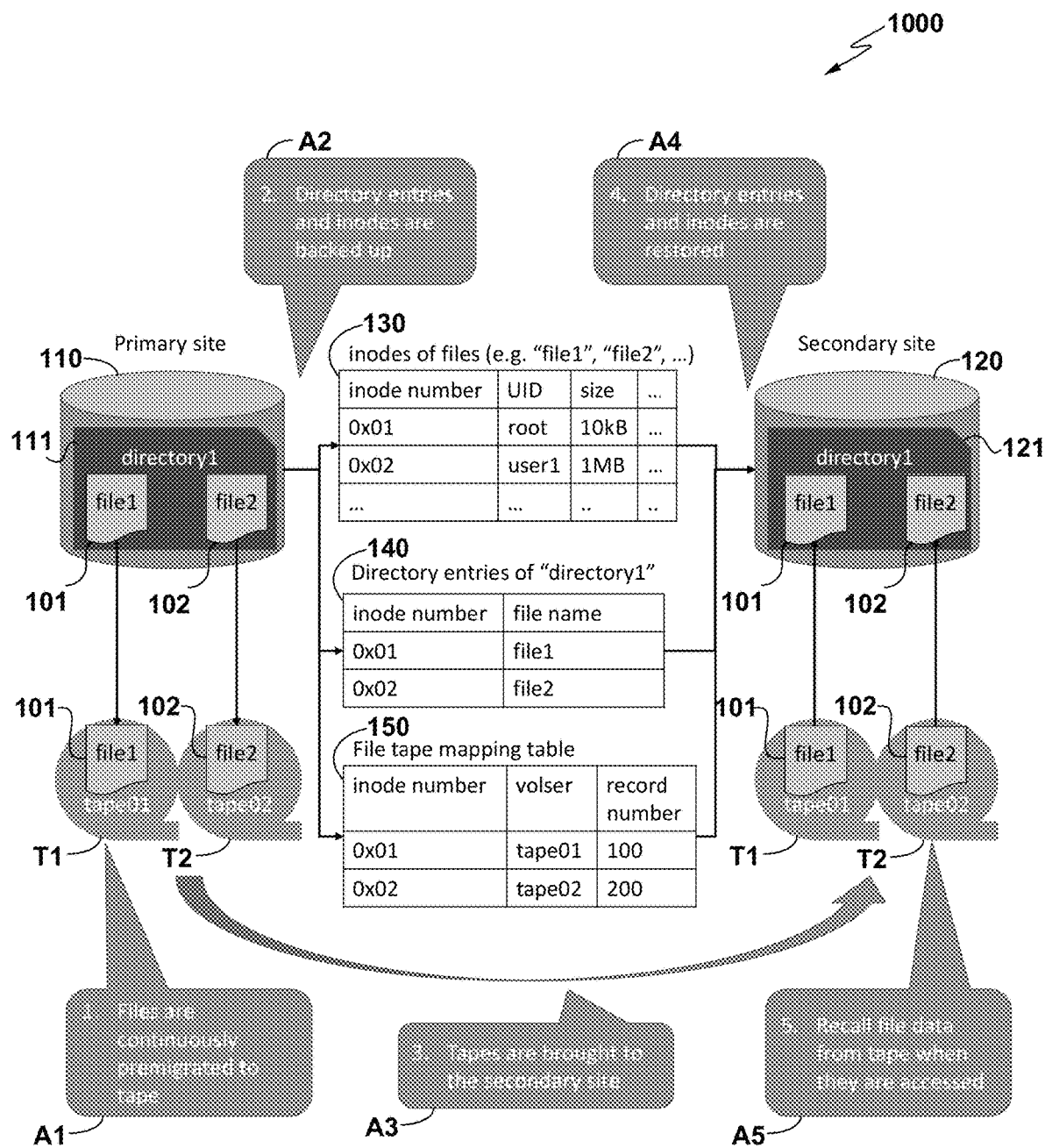
FIG. 1 is a block diagram illustrating a method of data backup at a first site and data restoration at a second site.

FIG. 1 depicts an exemplary system 1000 illustrating a method of restoring data stored in a hierarchical fashion (e.g., disk and backup tapes) at a first site and restored at another site (including metadata restoration). Primary site 110 (e.g., an operational site) may include data stored on disks that are backed up to tape, e.g., continuously. Primary site 110 may include a primary site directory 111 containing data files (e.g., a first data file 101 and a second data file 102).

At A1, data (e.g., first data file 101 and second data file 102) from the primary site directory 111 may be continuously copied (i.e., pre-migrated) to backup media (e.g., a first tape T1 and a second tape T2). These data may be considered effectively backed up because the data has been copied to a backup medium. The file system may be considered backed up when file tree information for the file system (e.g., inodes and directory entries) is copied, e.g., to the backup medium.

At A2, metadata for the backed up files (e.g., first data file 101 and second data file 102) may be written to the backup medium. The metadata may include inodes 130 of the files, which may include the inode number associated with the data files, the owner of the file (UID), the file size, a fileset identifier, etc. In this example, two inode numbers are listed as 0x01 and 0x02. The metadata may also include directory entry table 140 and a file-tape mapping table 150. The directory entry table 140 is an exemplary table for managing combinations of inode numbers and filenames associated with data files stored in a particular directory (e.g., primary site directory 111), and may include one or more directory entries. The file-tape mapping table 150 is an exemplary file-tape correspondence table for managing data files and the position of the data file in the backup medium, e.g., tape volume serial number (or volser), record number on the tape, etc. A file-tape correspondence table (e.g., file-tape mapping table 150) may be managed by software, such as Tivoli® Storage Manager (TSM) or Linear Tape File System Enterprise Edition™ (LTFS EE).

At A3, the backup media (e.g., tapes T1 and T2) may be brought to a secondary site 120 (e.g., a disaster recovery site).

At A4, metadata associated with the backed up data may be restored. In one example, file tree information for the backed up data is written from the backup media to the disk at the secondary site 120. In one example, the inodes 130, the directory entry table 140, and the file-tape mapping table 150 may be written from the backup media to the secondary site 120. Restoration of metadata may be separate from restoration of data files associated with the metadata. For example, at a time associated with data restoration, metadata may be initially restored and the data files associated with the metadata may remain on the backup media awaiting restoration, e.g., at a time associated with accessing or requesting the data files.

At A5, the data files associated with the metadata may be written to a disk at the secondary site 120. For example, first data file 101 and second data file 102 may be written to a secondary directory 121 (which may be a restoration of the primary site directory 111). In one example, metadata (e.g., file tree information, inodes, etc.) has previously been restored and written to a disk on secondary site 120, and in response to a recall/request to access data files from the backup media, the data files are written to the disk on secondary site 120. Restoration of the backed up data file may include receiving a request to access the backed up data file, e.g., by filename and/or path, and in response to the request, the inode number for the backed up data file may be obtained, e.g., from the directory entry table 140. The location of the backed up data file on the backup medium may be obtained, e.g., from the file-tape mapping table 150, using the inode number for the backed up data file.

Metadata backup restoration, as described above, may provide improved efficiency compared to conventional methods of data file backup restoration. With respect to metadata restoration, the time necessary to perform a file system backup restoration may be proportional to the amount of files in the file system because a file system backup restoration includes restoration of the metadata for all the files in the file system.

The efficiency of metadata backup restoration may be improved by performing restoration on a fileset by fileset basis. A fileset is a sub-tree below a directory in a file system. File systems such as General Parallel File System (GPFS™) or Journaling File System (JFS) support the creation of filesets. Metadata backup restoration on a fileset by fileset basis may enhance efficiency by excluding unnecessary files (and associated metadata) from the groups of files (e.g., filesets) to be backed up/restored. A fileset identifier may be included in the metadata, e.g., in the inodes for the files within the fileset. In addition, the frequency of backing up each fileset may be changed according to the importance of the files within each fileset.

It will be appreciated that FIG. 1 may depict a restoration of a file system at primary site 110 (e.g., containing primary site directory 111, first data file 101, and second data file 102) at secondary site 120. It will also be appreciated that primary site directory 111 (and first data file 101 and second data file 102) may represent a first fileset and secondary directory 121, which may be a restoration of the primary site directory 111, may represent a restoration of the first fileset.

Figure 2:
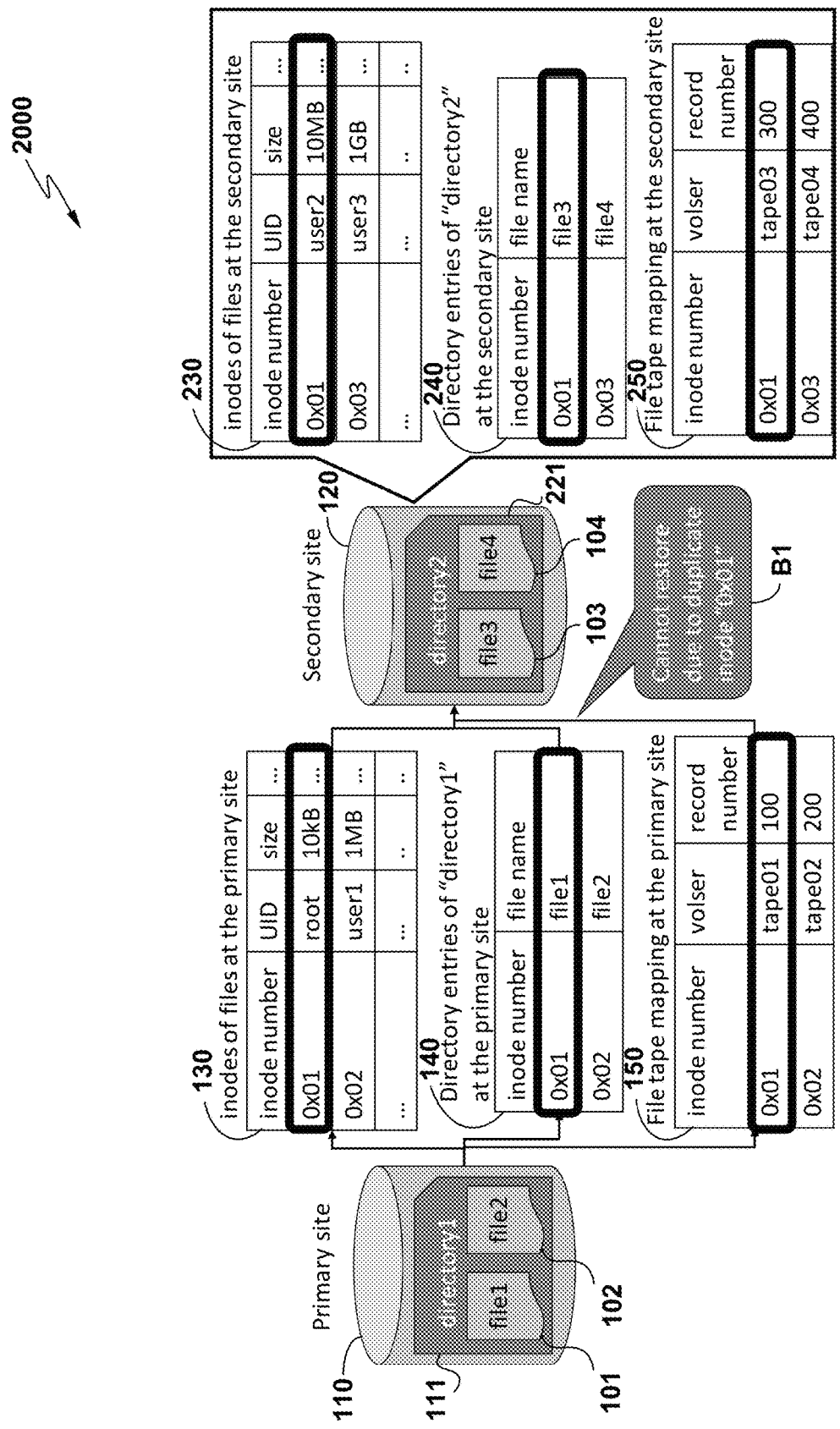
FIG. 2 is a block diagram illustrating a conflict between metadata at a first site and metadata at a second site.

FIG. 2 depicts an exemplary system 2000 illustrating an exemplary conflict between metadata for data generated at a first site and metadata for data generated (or stored) at a second site (e.g., a restoration site). Exemplary system 2000 may include primary site 110 (e.g., an operational site) with a primary site directory 111 containing data files (e.g., a first data file 101 and a second data file 102), as depicted in FIG. 1. However, in contrast to exemplary system 1000, exemplary system 2000 may contain pre-existing files at secondary site 120 (e.g., a third data file 103 and a fourth data file 104). These pre-existing files may be present at secondary site 120 at the time of metadata restoration.

As with exemplary system 1000 (depicted in FIG. 1), data from primary site directory 111 may be copied to backup media (not shown in FIG. 2), the backup media may be transported to secondary site 120 for restoration. Metadata restoration may include restoring inodes for the data files to be restored. However, file systems at separate locations (e.g., a file system in a primary site 110 and a file system in a secondary site 120) may independently assign inode numbers for files generated at each location. This may lead to one file system assigning an inode number to a file at the first location that is the same as another file at another location.

For example, secondary site 120 may have pre-existing files (e.g., third data file 103 and fourth data file 104) stored in a pre-existing directory (e.g., second directory 221) that is separate from the directory and files that have been generated at primary site 110. A file system at secondary site 120 may have assigned an exemplary inode number "0x01" to third data file 103, which may be written in second inodes 230, second directory entry table 240, and second file-tape mapping table 250. However, the exemplary inode number "0x01" may also be assigned to first data file 101 (by a file system at primary site 110).

At B1 (at the time of metadata restoration), the inode for first data file 101 cannot be restored by the file system at secondary site 120 because the inode number for first data file 101 is already allocated to a file at secondary site 120 (i.e., third data file 103).

It will be appreciated that primary site directory 111 and second directory 221 may be directories in separate filesets. It will further be appreciated that the file system at secondary site 120 may support the creation (and restoration) of filesets; however, all the inode numbers on the file system at secondary site 120 may be unique (within the file system).

Figure 3:
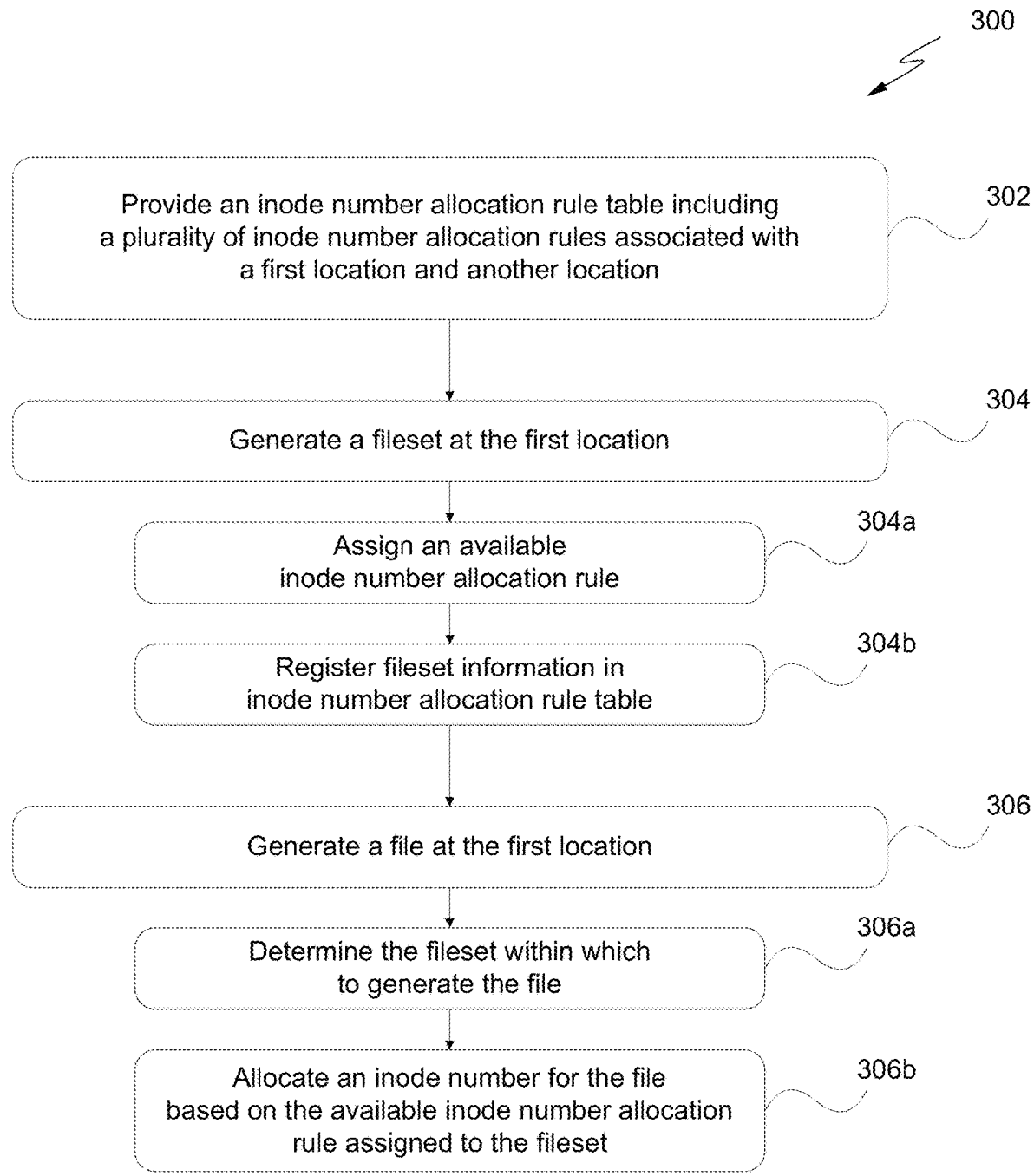
FIG. 3 is a flowchart illustrating an exemplary method of allocating non-conflicting inode numbers between files generated at a first location and files generated at another location, according to an embodiment.

FIG. 3 illustrates a first flowchart 300 depicting an exemplary method for allocating non-conflicting inode numbers between files generated at a first location and files generated at another location, according to an embodiment. At 302, an inode number allocation rule table may be provided. The inode number allocation rule table may include a plurality of inode number allocation rules associated with a first location and another location. The inode number allocation rule table may indicate availability of the plurality of inode number allocation rules for assignment. For example, the inode number allocation rule table may indicate whether a listed inode allocation rule has already been assigned or is available for assignment. Table 1, below, is an example of an inode number allocation rule, according to an embodiment.

TABLE 1

| Fileset ID | Fileset ID Allocated | Inode number allocation rule | Mount point | Site |
|---|---|---|---|---|
| 0 | Yes | $0 \ldots 2^{32-1}$ | / | Primary site |
| 1 | No | $2^{33} \ldots 2^{34-1}$ | | |
| 2 | Yes | $2^{34} \ldots 2^{35-1}$ | /home/user1 | Secondary site |
| ... | ... | ... | | |

As depicted in table 1, the inode allocation rule table may include columns that may contain a fileset ID, an allocation designation (e.g., whether the fileset ID has been allocated), an inode number allocation rule (associated with the fileset ID), a mount point for the fileset, and a site location. Exemplary table 1 lists the following inode number allocation rules: a first range of numbers including 0 to $2^{32-1}$; a second range of numbers including $2^{33}$ to $2^{34-1}$; and a third range of numbers including $2^{34}$ to $2^{35-1}$. In other embodiments, the inode number allocation rules may include a first rule for inode numbers whose remainder is 0 when divided by N, a second rule for inode numbers whose remainder is 1 when divided by N, a third rule for inode numbers whose remainder is 2 when divided by N, and so on.

In table 1, above, fileset ID's 0 and 2 have been allocated. In other words, the inode allocation rules associated with fileset ID's 0 and 2 have been assigned.

The locations (i.e., the first location and the another location) may be separate sites (e.g., a primary or operational site and a disaster recovery site, respectively), separate disks at the same site, or separate partitions on the same disk. It will be appreciated that the locations are not limited to the above examples and may include data storage solutions that may support the generation, management, and/or storage inode numbers, as described herein. The locations may be managed by separate file systems. The locations may contain or be associated with one or more computers, computer systems/servers, or computing nodes.

In one embodiment, provision of the inode allocation number rule table may include generating, maintaining, making available, etc., the inode allocation number rule table, e.g., to a file system that may use the inode allocation number rule table in the generation of filesets and/or files, and in particular, with respect to assigning inode numbers.

At 304, a fileset may be generated at the first location. The fileset may be generated in response to a request to create a new fileset. The request may be received by a file system associated with the first location. Generation of the fileset may include assigning an available inode number allocation rule to the fileset (see subpart 304a). In one embodiment, a file system may refer to the inode allocation rule table to determine an available inode number allocation rule, i.e., one that has not been assigned or allocated yet.

Generation of the fileset may further include registering fileset information in the inode number allocation rule table (see subpart 304b). The fileset information (i.e., information associated with the fileset) may include at least one of a fileset ID, a mount point (for the fileset), and an identification for the first location (e.g., the location where the fileset is generated). For example, referring back to table 1 (above), the fileset ID may be "0", the mount point may be "/", and the identification for the first location may be "Primary site". In one embodiment, the inode number allocation rule table may have one or more fileset IDs pre-populated, i.e., the inode number allocation rule table may include fileset IDs, and the file system may register the mount point and the site location of the new fileset in an available row.

In one embodiment, the file system may also update the allocation status of the fileset ID (and the associated inode allocation number rule). For example, registration of the fileset information may include changing the allocation status from "No" to "Yes" or "unassigned" to "assigned" or "0" to "1", and the like.

At 306, a file may be generated at the first location. The file may be generated in response to a request to create a new file. The request may be received by a file system associated with the first location. Generation of the file may include determining a fileset within which to generate the file (see subpart 306a). Information associated with the fileset may be included with the request to generate the new file.

Generation of the file may further include allocating an inode number for the file based on the available (i.e., previously available) inode number rule assigned to the fileset (see subpart 306b). For example, with reference to table 1, in response to a request to create a new file in the fileset assigned fileset ID "2", the file system may allocate to the new file an (unused) inode number that is in the range of $2^{34}$ to $2^{35-1}$.

It will be appreciated that the inode number allocation rule table, disclosed herein, may provide a method of assigning unique inode number allocation rules to individual filesets. It will also be appreciated that it is contemplated that unique inode number allocation rules for individual filesets may also provide unique inode number allocation rules for separate locations associated with separate filesets (e.g., a fileset in a first location and another fileset in another location). In one embodiment, unique inode number allocation rules may respectively provide unique, i.e., non-overlapping, sets of inode numbers, which may prevent inode conflict during metadata restoration from a first location to another location.

Figure 4:
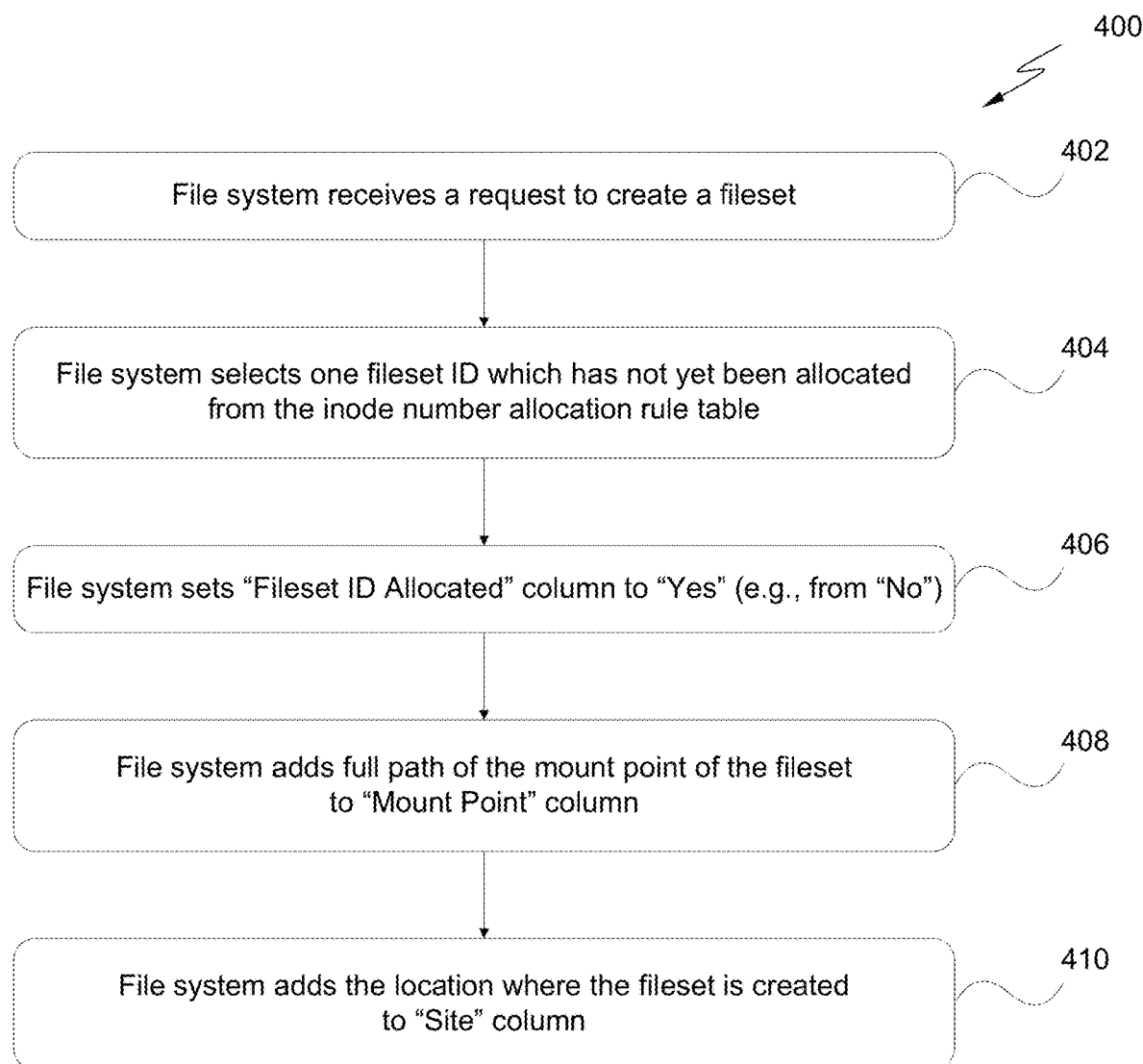
FIG. 4 is a flowchart illustrating an aspect of an exemplary method of allocating non-conflicting inode numbers between files generated at a first location and files generated at another location, according to an embodiment.

FIG. 4 illustrates a second flowchart 400 depicting an aspect of an exemplary method for allocating non-conflicting inode numbers between files generated at a first location and files generated at another location, according to an embodiment. At 402, a file system, e.g., associated with a first location, may receive a request to create a fileset. The file system may include, or may access, an inode allocation rule table that may include a fileset ID column, an allocation status column (e.g., "Fileset ID Allocated"), an inode allocation number rule column, a mount point column, and a site column. (For example, the inode allocation rule table may be table 1, above.)

At 404, the file system may select an available fileset ID (i.e., a fileset ID that has not yet been allocated) from the inode number allocation rule table. At 406, the file system may change the allocation status of the fileset ID. For example, the file system may set the entry in the "Fileset ID Allocated" column of the inode number allocation rule table to "Yes" (e.g., from "No"). At 408, the file system may add the full path of the mount point of the fileset to the "Mount Point" column of the inode number allocation rule table. At 410, the file system may add the location where the fileset is created to the "Site" column of the inode number allocation rule table.

Figure 5:
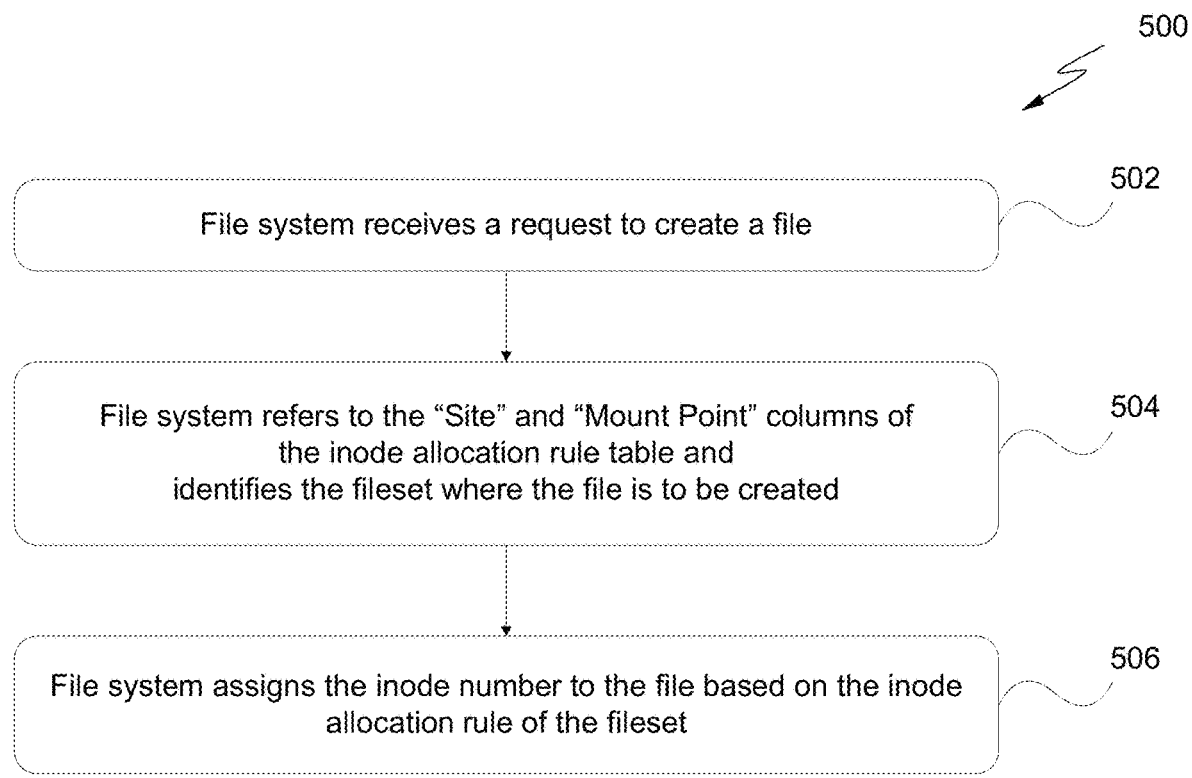
FIG. 5 is a flowchart illustrating another aspect of an exemplary method of allocating non-conflicting inode numbers between files generated at a first location and files generated at another location, according to an embodiment.

FIG. 5 illustrates a third flowchart 500 depicting another aspect of an exemplary method for allocating non-conflicting inode numbers between files generated at a first location and files generated at another location, according to an embodiment. At 502, a file system, e.g., associated with a first location, may receive a request to create a file. The file system may include or may access an inode number allocation rule table as described above, e.g., table 1.

At 504, the file system may refer to location and/or mount columns (e.g., "Site" column and "Mount Point" column, respectively) in an associated inode allocation number rule table and identify the fileset where the file is to be created. The file system may also refer to the inode number allocation rule table to determine which inode number rule to apply when assigning an inode number to the file to be created.

At 506, the file system may assign an inode number to the file (to be created) based on the inode number allocation rule for the fileset, which may be listed in the inode number allocation rule table.

Figure 6:
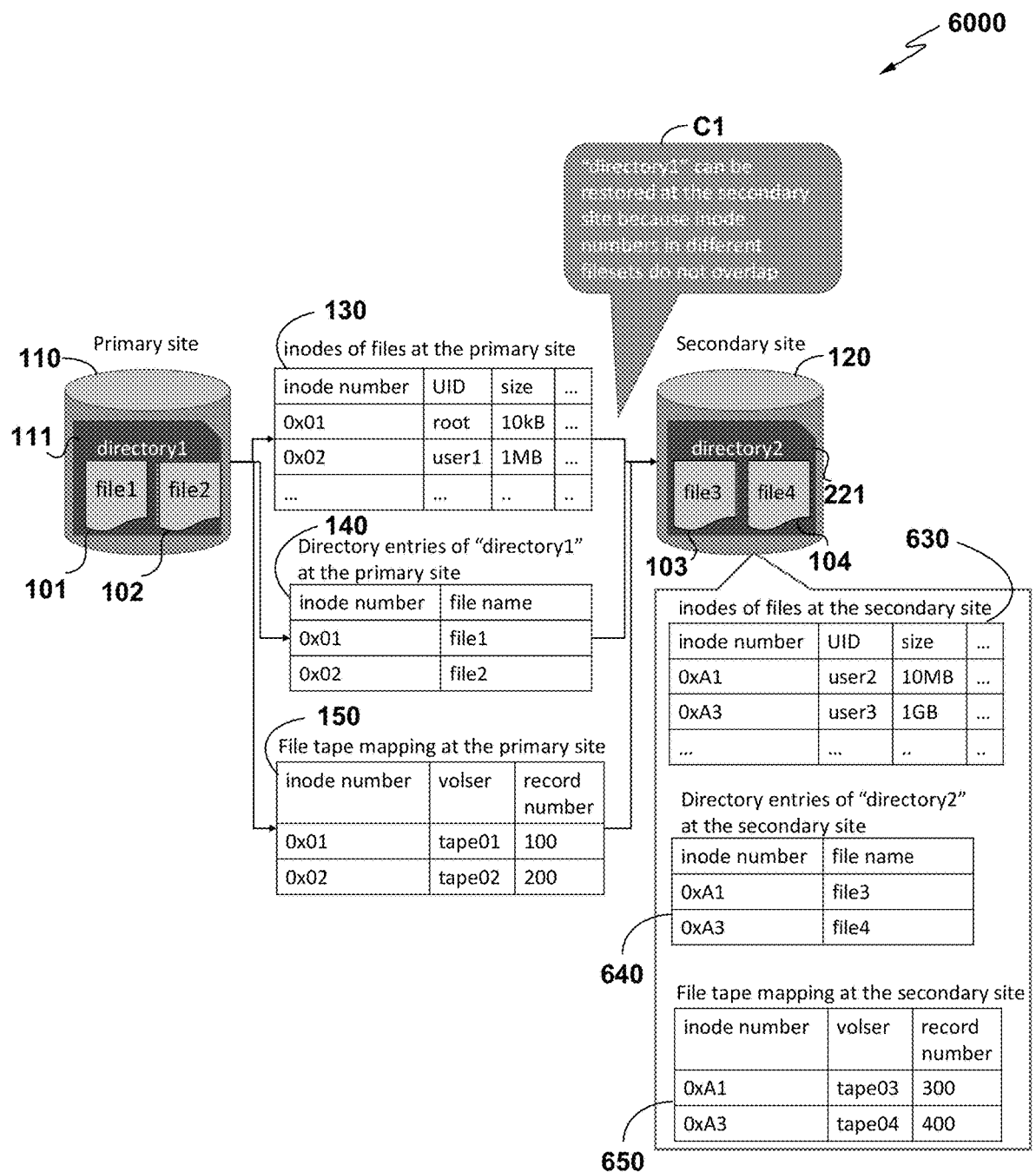
FIG. 6 is a block diagram illustrating a method of allocating non-conflicting inode numbers between files generated at a first location and files generated at another location, according to an embodiment.

FIG. 6 depicts an exemplary system 6000 illustrating a method of allocating non-conflicting inode numbers between files generated at a first location and files generated at another location, according to an embodiment. Exemplary system 6000 may include primary site 110 (e.g., an operational site) with a primary site directory 111 containing data files (e.g., first data file 101 and second data file 102), as depicted in FIGS. 1 and 2, and secondary site 120 (e.g., a disaster recovery site) with a second directory 221 containing other files (e.g., third data file 103 and fourth data file 104), as depicted in FIG. 2. However, in contrast to exemplary systems 1000 and 2000, exemplary system 6000 may include an inode number allocation rule table (not shown) that may ensure the inode numbers assigned to files at secondary site 120 are unique from the inode numbers assigned to files from primary site 110.

At C1, the files generated at primary site 110 may have inode numbers that are unique from any inode numbers used (or assigned) at secondary site 120, and thus, the inodes associated with the files from primary site 110 (e.g., first file 101 and second file 102) may be restored at secondary site 120 without conflict.

For example, files generated at primary site 110 may have inode numbers determined by a first inode allocation number rule and files generated at secondary site 120 may have inode numbers determined by a second inode allocation number rule, and in particular, the range of inode numbers determined by the first inode allocation number rule (e.g., 0x01, 0x02, . . . 0x0N) may not overlap with the range of inode numbers determined by the second allocation number rule (e.g., 0xA1, 0xA2, . . . 0xAN).

In contrast to exemplary systems 1000 and 2000, exemplary system 6000 may include files at secondary site 120 having inode numbers that do not overlap (or conflict) with inode numbers associated with files from primary site 110. For example, secondary inodes 630, secondary directory entry table 640, and secondary file-tape mapping table 650 may contain inode numbers (associated with files stored at secondary site 120) that do not overlap (or conflict) with inode numbers associated with files from primary site 110.

During metadata restoration, as depicted in exemplary system 6000, the inode numbers for first file 101 and second file 102 (0x01 and 0x01, respectively) may be added to secondary inodes 630, secondary directory entry table 640, and secondary file-tape mapping table 650, and the inodes associated with first file 101 and second file 102 may be restored.

In one embodiment, a method for allocating non-conflicting inode numbers between files generated at a first location and files generated at another location may further include generating another fileset at the another location, which may include assigning another available inode number allocation rule to the another fileset, and registering, in the inode number allocation rule table, information associated with the another fileset. The information associated with the another fileset may include at least one of another fileset ID, another mount point, and an identification for the another location. The method may further include generating another file at the another location, which may include determining the another fileset within which to generate the another file, and allocating an inode number for the another file based on the another available inode number allocation rule assigned to the another fileset. The inode number for the another file may be different from the inode number for the first file.

In one embodiment, each inode number allocation rule from the plurality of inode number allocation rules determines a set of inode numbers that are different from sets of inode numbers determined by other inode number allocation rules from the plurality of inode number allocation rules.

In one embodiment, the another location contains one or more files with an inode number from an initial set of inode numbers, and the available inode number allocation rule assigned to the fileset allocates inode numbers different from the initial set of inode numbers. In a further embodiment, the initial set of inode numbers are allocated by one or more previously assigned inode number allocation rules, and the available inode number allocation rule allocates inode numbers different from inode numbers allocated by each of the one or more previously assigned inode number allocation rules.

In one embodiment, generating the fileset at the first location further includes updating the availability of the available inode number allocation rule to the fileset.

In one embodiment, the method may further include restoring the file (e.g., from the first location) at another location based on the inode number for the file.

In one embodiment, the inode number allocation rule table is managed by a server associated with one of the first location and the another location. For example, the server may be located at the first location or the another location.

In one embodiment, the inode number allocation rule table is managed by an external server. For example, the external server may be separate from the first and the another location, e.g., the external server may be associated with a tertiary location.

In one embodiment, the method may further include a second inode number allocation rule table, and the second inode number allocation rule table is synchronized with the inode number allocation rule table. In a further embodiment, the inode number allocation rule table is managed by a server associated with the first location and the second inode number allocation rule table is managed by another server associated with the another location.

Embodiments disclosed and contemplated herein may be implemented and performed on a computing node, e.g., disclosed herein.

Figure 7:
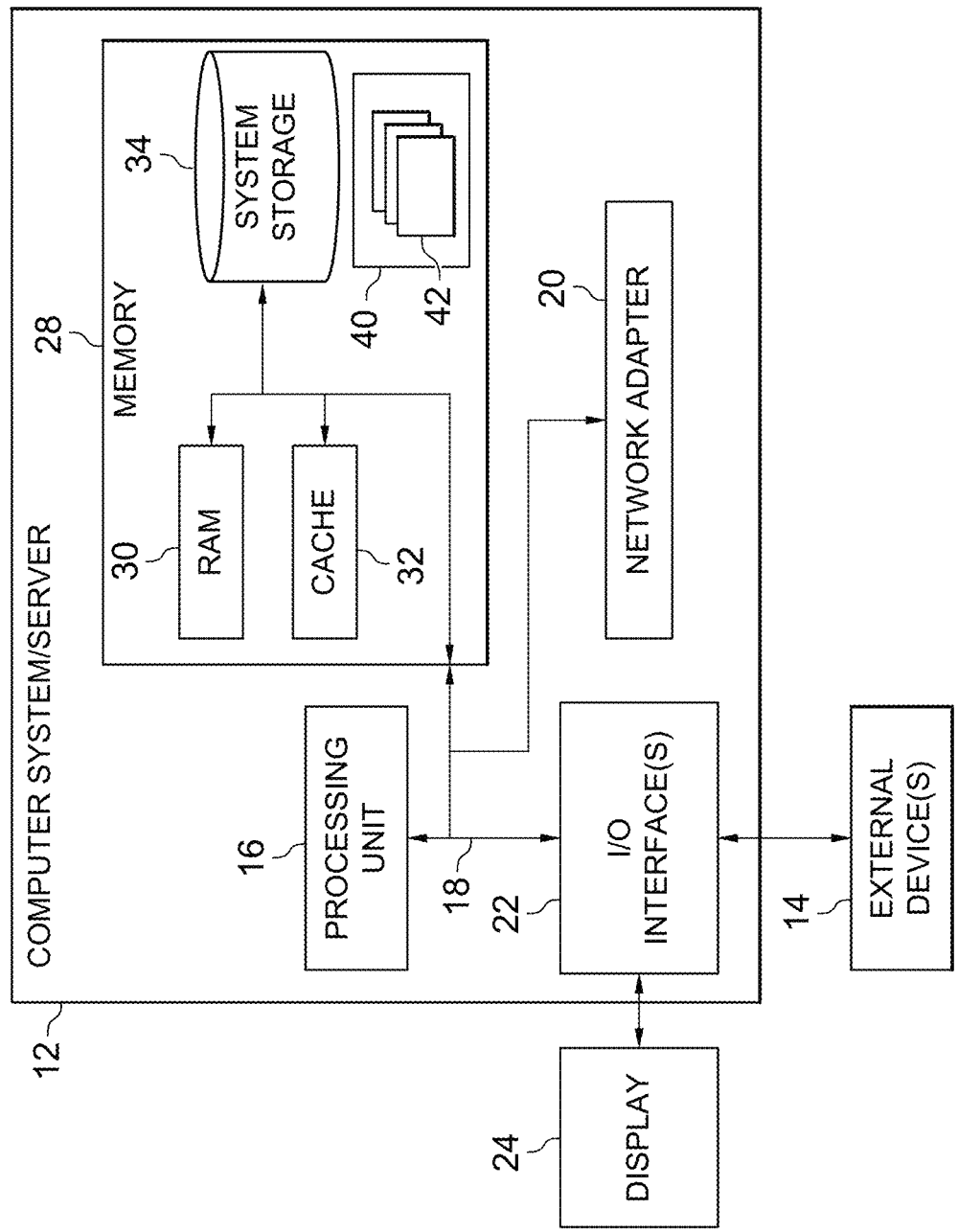
FIG. 7 is a block diagram illustrating a computing node, according to an aspect of the invention.

FIG. 7 depicts a schematic illustrating an example of a computing node. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 7, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
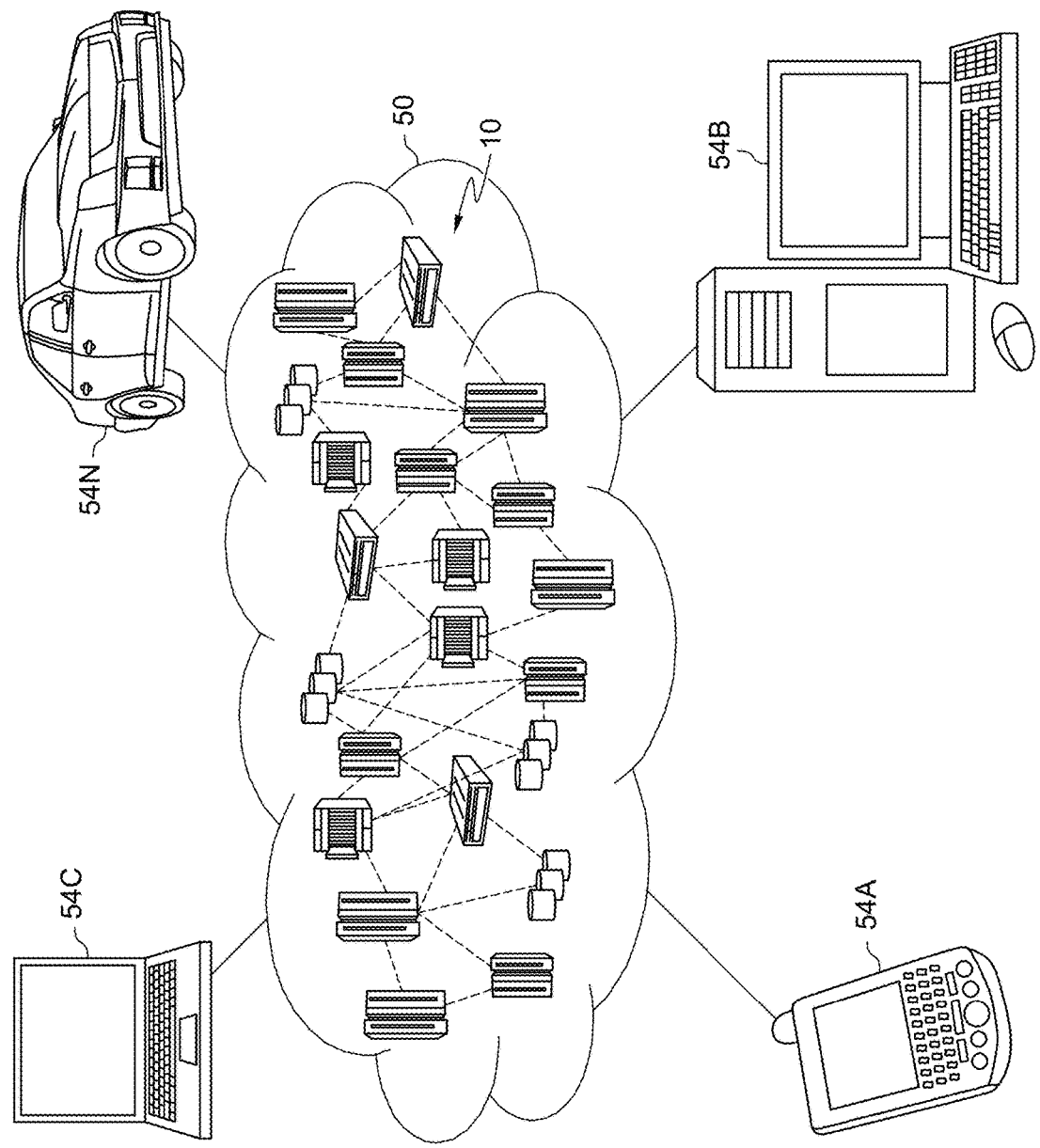
FIG. 8 depicts a cloud computing environment according to an embodiment of the present invention.

Referring now to FIG. 8, illustrative cloud computing environment 50 is depicted. As shown, cloud computing environment 50 comprises one or more (cloud) computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
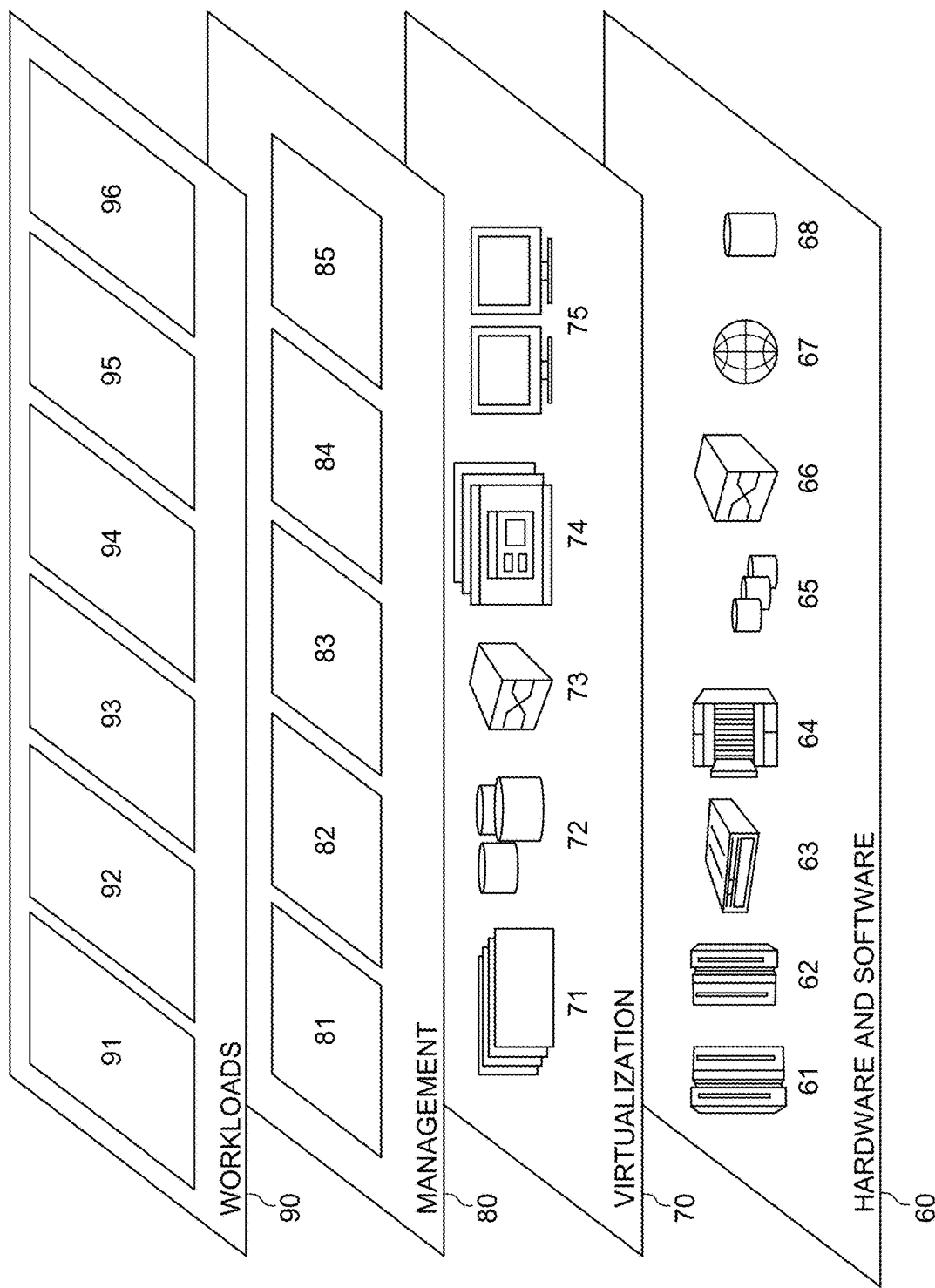
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

Methods for allocating non-conflicting inode numbers between files generated at a first location and files generated at another location may be performed in a cloud environment, e.g., in the hardware and software layer 60 and/or the virtualization layer 70.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for allocating non-conflicting inode numbers between files generated at a first location and files generated at a second location, the method comprising:

providing an inode number allocation rule table comprising an inode number allocation rule column and an allocation status column, the inode number allocation rule column listing a plurality of inode number allocation rules for generating unique inode numbers for files associated with the first location, the second location, and an unassigned location, wherein the allocation status column indicates an assigned status for each inode number allocation rule of the plurality of inode number allocation rules that are assigned to one of the first location and the second location and an unassigned status for each inode number allocation rule of the plurality of inode number allocation rules that are not yet assigned to one of the first location and the second location, wherein the inode number allocation rule table includes at least one inode number allocation rule having the unassigned status, wherein the unassigned status indicates an availability of the at least one inode number allocation rule for assignment to one of the first location and the second location, and wherein the first location is on a first server and the second location is on a second server;

generating a fileset at the first location comprising:
referencing the inode number allocation rule table to identify the at least one inode number allocation rule having the unassigned status;
assigning the at least one inode number allocation rule having the unassigned status to the fileset at the first location;
changing, in the allocation status column of the inode number allocation rule table, the unassigned status of the at least one inode number allocation rule to the assigned status;
registering, in the inode number allocation rule table, information associated with the fileset comprising at least one of a fileset ID, a mount point, and an identification for the first location; and
generating a file at the first location comprising:
determining the fileset within which to generate the file; and
allocating an inode number for the file based on the assigned inode number allocation rule associated with the determined fileset.

2. The method according to claim 1, further comprising:
generating another fileset at the second location comprising:
assigning another available inode number allocation rule to the another fileset; and
registering, in the inode number allocation rule table, information associated with the another fileset comprising at least one of another fileset ID, another mount point, and an identification for the second location; and
generating another file at the second location comprising:
determining the another fileset within which to generate the another file; and
allocating another inode number for the another file based on the assigned another available inode number allocation rule associated with the determined another fileset; and
wherein the allocated another inode number for the another file is different from the allocated inode number for the file.

3. The method according to claim 1, wherein each inode number allocation rule from the plurality of inode number allocation rules determines a set of inode numbers that are different from sets of other inode numbers determined by other inode number allocation rules from the plurality of inode number allocation rules.

4. The method according to claim 1, wherein the second location contains one or more files with an associated inode number from an initial set of inode numbers, and the assigned inode number allocation rule associated with the fileset allocates another set of inode numbers different from the initial set of inode numbers.

5. The method according to claim 4, wherein the initial set of inode numbers are allocated by one or more previously assigned inode number allocation rules, and the assigned inode number allocation rule associated with the fileset allocates a first inode number different from a second inode number allocated by each of the one or more previously assigned inode number allocation rules.

6. The method according to claim 1, wherein generating the fileset at the first location further comprises:
updating the availability of the assigned inode number allocation rule associated with the fileset.

7. The method according to claim 1, further comprising: restoring the generated file at the second location based on the allocated inode number for the file.

8. The method according to claim 1, wherein the inode number allocation rule table is managed by an associated server corresponding to one of the first location and the second location.

9. The method according to claim 1, wherein the inode number allocation rule table is managed by an external server.

10. The method according to claim 1, further comprising:
a second inode number allocation rule table, wherein the second inode number allocation rule table is synchronized with the inode number allocation rule table.

11. The method according to claim 10, wherein the inode number allocation rule table is managed by the first server associated with the first location and the second inode number allocation rule table is managed by the second server associated with the second location.

12. A computer program product for allocating non-conflicting inode numbers between files generated at a first location and files generated at a second location, the computer program product comprising at least one computer readable non-transitory storage medium having computer readable program instructions thereon for execution by a processor, the computer readable program instructions comprising program instructions for:
providing an inode number allocation rule table comprising an inode number allocation rule column and an allocation status column, the inode number allocation rule column listing a plurality of inode number allocation rules for generating unique inode numbers for files associated with the first location, the second location, and an unassigned location, wherein the allocation status column indicates an assigned status for each inode number allocation rule of the plurality of inode number allocation rules that are assigned to one of the first location and the second location and an unassigned status for each inode number allocation rule of the plurality of inode number allocation rules that are not yet assigned to one of the first location and the second location, wherein the inode number allocation rule table includes at least one inode number allocation rule having the unassigned status, wherein the unassigned status indicates an availability of the at least one inode number allocation rule for assignment to one of the first location and the second location, and wherein the first location is on a first server and the second location is on a second server;
generating a fileset at the first location comprising:
referencing the inode number allocation rule table to identify the at least one inode number allocation rule having the unassigned status;
assigning the at least one inode number allocation rule having the unassigned status to the fileset at the first location;
changing, in the allocation status column of the inode number allocation rule table, the unassigned status of the at least one inode number allocation rule to the assigned status;
registering, in the inode number allocation rule table, information associated with the fileset comprising at least one of a fileset ID, a mount point, and an identification for the first location; and
generating a file at the first location comprising:
determining the fileset within which to generate the file; and
allocating an inode number for the file based on the assigned inode number allocation rule associated with the determined fileset.

13. The computer program product according to claim 12, wherein the computer readable program instructions further comprise program instructions for:
    generating another fileset at the second location comprising:
        assigning another available inode number allocation rule to the another fileset; and
        registering, in the inode number allocation rule table, information associated with the another fileset comprising at least one of another fileset ID, another mount point, and an identification for the second location; and
    generating another file at the second location comprising:
        determining the another fileset within which to generate the another file; and
        allocating another inode number for the another file based on the assigned another available inode number allocation rule associated with the determined another fileset; and
        wherein the allocated another inode number for the another file is different from the allocated inode number for the file.

14. The computer program product according to claim 12, wherein each inode number allocation rule from the plurality of inode number allocation rules determines a set of inode numbers that are different from sets of other inode numbers determined by other inode number allocation rules from the plurality of inode number allocation rules.

15. The computer program product according to claim 12, wherein the second location contains one or more files with an associated inode number from an initial set of inode numbers, and the assigned inode number allocation rule associated with the fileset allocates another set of inode numbers different from the initial set of inode numbers.

16. The computer program product according to claim 15, wherein the initial set of inode numbers are allocated by one or more previously assigned inode number allocation rules, and the assigned inode number allocation rule associated with the fileset allocates a first inode number different from a second inode number allocated by each of the one or more previously assigned inode number allocation rules.

17. A computer system for allocating non-conflicting inode numbers between files generated at a first location and files generated at a second location, the computer system comprising:
    at least one processing unit;
    at least one computer readable memory;
    at least one computer readable tangible, non-transitory storage medium; and
    program instructions stored on the at least one computer readable tangible, non-transitory storage medium for execution by the at least one processing unit via the at least one computer readable memory, wherein the program instructions comprise program instructions for:
    providing an inode number allocation rule table comprising an inode number allocation rule column and an allocation status column, the inode number allocation rule column listing a plurality of inode number allocation rules for generating unique inode numbers for files associated with the first location, the second location, and an unassigned location, wherein the allocation status column indicates an assigned status for each inode number allocation rule of the plurality of inode number allocation rules that are assigned to one of the first location and the second location and an unassigned status for each inode number allocation rule of the plurality of inode number allocation rules that are not yet assigned to one of the first location and the second location, wherein the inode number allocation rule table includes at least one inode number allocation rule having the unassigned status, wherein the unassigned status indicates an availability of the at least one inode number allocation rule for assignment to one of the first location and the second location, and wherein the first location is on a first server and the second location is on a second server;
    generating a fileset at the first location comprising:
    referencing the inode number allocation rule table to identify the at least one inode number allocation rule having the unassigned status;
    assigning the at least one inode number allocation rule having the unassigned status to the fileset at the first location;
    changing, in the allocation status column of the inode number allocation rule table, the unassigned status of the at least one inode number allocation rule to the assigned status;
    registering, in the inode number allocation rule table, information associated with the fileset comprising at least one of a fileset ID, a mount point, and an identification for the first location; and
    generating a file at the first location comprising:
    determining the fileset within which to generate the file; and
    allocating an inode number for the file based on the assigned inode number allocation rule associated with the determined fileset.

18. The computer system according to claim 17, wherein the program instructions further comprise program instructions for:
    generating another fileset at the second location comprising:
        assigning another available inode number allocation rule to the another fileset; and
        registering, in the inode number allocation rule table, information associated with the another fileset comprising at least one of another fileset ID, another mount point, and an identification for the second location; and
    generating another file at the second location comprising:
        determining the another fileset within which to generate the another file; and
        allocating another inode number for the another file based on the assigned another available inode number allocation rule associated with the determined another fileset; and
        wherein the allocated another inode number for the another file is different from the allocated inode number for the file.

19. The computer system according to claim 17, wherein each inode number allocation rule from the plurality of inode number allocation rules determines a set of inode numbers that are different from sets of other inode numbers determined by other inode number allocation rules from the plurality of inode number allocation rules.

20. The computer system according to claim 17, wherein the second location contains one or more files with an associated inode number from an initial set of inode numbers, and the assigned inode number allocation rule associated with the fileset allocates another set of inode numbers different from the initial set of inode numbers.

* * * * *